(No Model.)
W. A. COOKE.
ARTIFICIAL BAIT FOR FISHING.
No. 360,339. Patented Mar. 29, 1887.
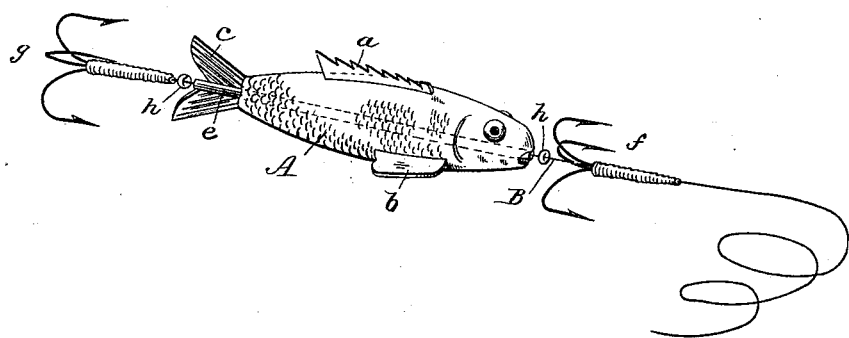
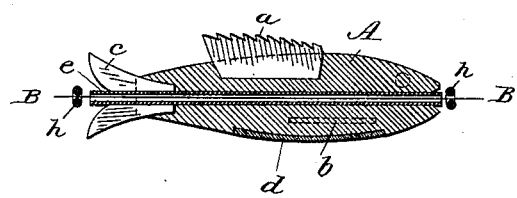

UNITED STATES PATENT OFFICE.

WILLIAM A. COOKE, OF GAITHERSBURG, MARYLAND.

ARTIFICIAL BAIT FOR FISHING.

SPECIFICATION forming part of Letters Patent No. 360,339, dated March 29, 1887.

Application filed February 23, 1887. Serial No. 228,509. (No model.)

*To all whom it may concern:*

Be it known that I, WILLIAM A. COOKE, of Gaithersburg, in the State of Maryland, have invented a certain new and useful Improvement in Artificial Bait for Fishing, of which the following is a specification.

What I have in view is an artificial minnow for use in casting or trolling or in other modes of fishing. It is my object to produce a minnow of this kind which in its movements on the water shall more accurately and closely resemble the living fish of which it is an imitation than has been the case with artificial minnows such as heretofore have been in use.

The ordinary artificial minnow is a spinning bait—that is to say, it is so made that when drawn through the water it will spin upon a longitudinal axis after the fashion of spoon-bait—this being due to its general structure coupled with the twist given to its fins or tail, or both, by which it is compelled to revolve. Such movement is wholly foreign, of course, to the natural minnow.

Under my invention I make the body of the minnow of some light, buoyant material—such, for instance, as cork or locust-bark. Its fins and tail are made of very light metal or any other suitable material, and are put into proper place on the body; but care is taken in applying them that they shall stand perfectly straight in the line of draft of the bait, so that they shall have no tendency to cause the minnow to spin, but shall rather tend to counteract and neutralize any such tendency.

The body is weighted in the belly, so that it will stand back up at all times. With a minnow of this kind the movement of the line to which it is attached will impart to it movements which closely imitate those of the natural fish, and there is none of that spinning motion found in other artificial bait of this kind, so that there is no tendency to twist the line, and consequently no necessity for using swivels or the like.

In the accompanying drawings, to which I will now refer in order to more fully explain my invention, Figure 1 is a perspective view of the artificial minnow with leader and gangs of hooks as I prefer to employ them. Fig. 2 is a longitudinal vertical central section of the minnow.

A is the body of the minnow, made of cork or other light material, provided with back fin, *a*, side fins, *b*, and tail *c*, placed as hereinbefore indicated, so as to offer no deflecting or twisting surfaces to the action of the water through which the minnow may be drawn. The body is weighted in the belly—as, for instance, by a small strip of lead, *d*, secured therein.

The fish is of course painted in suitable colors, and has a water-proof finish. It may be attached to the leader or line in various ways well known to fishermen. I prefer to insert through it from head to tail a small light metal tube, *e*, through which the leader B can pass, one gang of hooks, *f*, being secured to the leader just in advance of the head of the minnow, and another gang, *g*, just in rear of its tail, beads *h* being interposed between the minnow and the gangs of hooks to prevent them from chafing. Under this arrangement the minnow is swiveled, as it were, on the leader, and can maintain its upright position even if there should be a tendency in the leader to twist.

What I claim, and desire to secure by Letters Patent, is—

1. The artificial minnow having a body of buoyant material, provided with fins and tail without twist or deflecting surfaces, and loaded or weighted in the belly, as and for the purposes hereinbefore set forth.

2. The artificial minnow having a body of buoyant material, provided with the longitudinal internal tube, *e*, for the passages of the leader, and with fins and tail without twist or deflecting surfaces, and weighted in the belly, as and for the purposes hereinbefore set forth.

In testimony whereof I have hereunto set my hand this 19th day of February, 1887.

WILLIAM A. COOKE.

Witnesses:
M. BAILEY,
LEE OFFUTT.